United States Patent

[11] 3,629,832

[72] Inventors Charles B. Vogel, Houston, Tex.
[21] Appl. No. 253,682
[22] Filed Jan. 24, 1963
[45] Patented Dec. 21, 1971
[73] Assignee Shell Oil Company
 New York, N.Y.
 Continuation-in-part of application Ser. No. 493,999, Mar. 14, 1955. This application Jan. 24, 1963, Ser. No. 253,682

[54] WELL LOGGING
 5 Claims, 10 Drawing Figs.
[52] U.S. Cl. ............................................. 340/15.5 TN,
 181/0.5 FS, 340/15.5 GC, 340/15.5 DC,
 340/18 DC
[51] Int. Cl. ..................................................... G01v 1/40
[50] Field of Search ........................................ 340/18 TI,
 18 OS

[56] References Cited
 UNITED STATES PATENTS
 2,931,455  4/1960  Loofbourrow ............... 181/0.5

*Primary Examiner*—Rodney D. Bennett, Jr.
*Assistant Examiner*—Daniel C. Kaufman
*Attorney*—Theodore E. Bieber CLAIM: 3. In an acoustical logging system including at least one receiver and a repetitively excited transmitter contained within an instrument adapted to traverse a borehole, a method for reducing the incidence of erroneous recorded measurement comprising:
 a. generating a relatively large signal in time relationship to the excitation of the transmitter;
 b. rendering effective a normally ineffective recording system in response to said relatively large signal;
 c. and rendering said recording system ineffective in response to succeeding relatively smaller signals from the receiver contained in said subsurface instrument.

FIG. 1

INVENTOR:
C. B. VOGEL

INVENTOR
C.B. VOGEL
BY Theodore E. Bieber
HIS ATTORNEY

INVENTOR:
CHARLES B. VOGEL
BY: *Theodore E. Bieber*
HIS ATTORNEY

WELL LOGGING

This application is a continuation-in-part of application, Ser. No. 493,999, filed Mar. 14, 1955, by C. B. Vogel, entitled "Well Logging."

This invention pertains to well logging and specifically to acoustical well logging in which measurements are made from within a borehole of the velocity and/or reciprocal velocity of earth formations penetrated by said borehole.

In the usual practice of this type of logging there are provided subsurface instruments and a surface recorder by means of which are displayed indications of the velocity or reciprocal velocity at several known depths within the earth penetrated by the borehole. Sound waves are produced which impinge upon one or more receiving transducers, and electrical signals resulting from such impingement are transmitted to the surface whereby a record is made of the velocity or reciprocal velocity of the earth at known depths. In prior art practice of this type of logging, several difficulties are encountered. One set of difficulties involves quantitative use of the recorded data whereby computations must be made. In the prior art it is common for the transmitting transducer to be excited at a high repetition rate, such as, for example, 5 or 10 excitations per second. The use of such a high repetition rate produces records on which the plotted curves are relatively smooth, and such records are particularly useful for correlation purposes where it is desired to correlate a bed penetrated by one borehole with a corresponding bed penetrated by another borehole. However, in the production of smooth plotted curves resulting from the use of a high repetition rate, there are produced many more separate measurements than are actually needed for quantitative computations; that is to say, the resulting measurements are highly redundant. As a result, there are produced more erroneous measurements than would result if only the number of measurements required for computation were produced. This production of large numbers of erroneous readings is confusing and inconvenient for quantitative use of the data. Furthermore, in the prior art it is common for the recording circuitry to be effective in the entire period during which logging measurements are carried out, again resulting in the production of many erroneous readings.

A second set of difficulties encountered in this type of logging involves the characteristics of transduced receiver signals. Each receiver signal has a duration exceeding 1 millisecond. If the distance between a pair of receivers used to terminate the measuring interval is rather long, for example, 100 feet, then the respective receiving transducer signals may each be connected to a single signal transmission means, such as a conductor pair in a well logging cable, and transmitted to the surface for recording purposes. Under these conditions the signals will be separably received at the surface and can be used to operate a recorder. However, where the measuring interval is of the order of 1 to 5 feet, then the transduced receiver signals tend to overlap, leading to indefiniteness of the recorded readings or, at the very least, to accuracy thereof. Furthermore, the high-frequency content and resulting complexity of the transduced receiver signals preclude the possibility of readily overcoming this difficulty by merely connecting one transduced receiver to one conductor pair and connecting a second transduced receiver signal to a second conductor pair, because of the fact that the high-frequency content and complexity of the signal results in excessive crossfeed between separate conductor pairs in well logging cables and leaves the problem substantially unsolved.

Another type of difficulty encountered in acoustical well logging where the data are to be used quantitatively involves the drift and often inaccurate calibration of the recording instruments. Because of the drift and inaccuracy of calibration, considerable error often arises in computations made using acoustical logging data. Drift and faulty calibration are generally attributable to drift in the characteristics of components used in the electronic apparatus and are also attributable to variation of the characteristics of the received signals and of the well logging cable over which these are transmitted.

It is accordingly a principal object of this invention to provide a method and apparatus for overcoming the difficulties listed above in the practice of acoustical well logging, and to provide a system free in large part of the objectionable features outlined above.

Another object of the present invention is to provide increased convenience for computation and reduced confusion from noise in the recording of acoustical well logging data, by recording the data at preselected depths.

Another object of the present invention is to provide records of acoustical logging data on which the confusing effects of noise are reduced by selectively recording said data only after production of a synchronization pulse.

Another object of the present invention is to reduce and substantially eliminate from recorded acoustical logging data the confusing effects of the intermixing of transduced receiver signals, in combination with other features of the invention.

Another object of the present invention is to provide in combination with the above features a digital counter for measuring the travel time of acoustical pulses within the earth, to provide high accuracy.

Another object of the present invention is to provide in combination with the digital counter, a digital-to-analog converter for a convenient presentation of acoustical logging data in highly accurate form.

Another object of the present invention is the provision of records made at preselected depths, even when the transmitter repetition rate is relatively high, to produce a smooth plotted curve plus sampled data.

Another object of the present invention is to provide a method for transduced receiver pulse translation which is particularly reliable and simple and is especially adaptable to the measurement of acoustical properties of the earth over very short intervals such as, for example, 1 or 2 feet.

Another object of the present invention is provision for recording of oscillograms at selected depths of the traverse of a well logging instrument in a borehole and the marking on an analog-plotted curve of the depths at which said oscillograms are recorded.

The above and other objects of the present invention are obtained by providing an acoustic well logging system that produces records substantially devoid of redundant measurements and erroneous indications. The present system is arranged to generate a series of acoustic impulses within the borehole of a well and record a series of measurements obtained with the measuring interval between a pair of transducers coinciding with discrete and contiguous intervals of the borehole while the times at which the recording elements are responsive to the transducer signals are restricted to reduce their response to noise. In this system a transmitting and one or more receiving transducers are disposed upon a coupling link and electrically connected to electronic apparatus which is housed in a pressuretight enclosure. This assembly makes up a subsurface tool or probe which is lowered into a borehole by means of a well logging cable. Over the conductor pairs of the well logging cable are transmitted to a surface recorder signals which are indicative of the acoustic velocity and of other acoustic properties of the subsurface formations penetrated by the borehole.

To reduce the incidence of redundant measurements and to provide records with reduced incidence of erroneous indications, the instruments are operated in a fashion to sample the earth at predetermined depths as they are vertically traversed through the borehole. For example, in a preferred embodiment the transmitting transducer is energized each time the depth of the probe changes by a depth increment equal to the fixed spacing between a pair of receiving transducers. This results in the production of a steplike segmented record, each segment representing a separate, distinct depth interval in the earth. This type of record is especially convenient for computing therefrom the total accumulated acoustic travel time between two depth points within the borehole, because only simple addition is required. Furthermore, the reduction in redundancy of measurement reduces the number of erroneous indications produced by noise within the borehole.

To still further reduce the incidence of erroneous measurements the instruments are so constructed that the recorder is effective only after the production of a signal produced in fixed time relationship with the cycle of transmitter pulse production. This construction makes the recorder insensitive to noise signals produced at instants in the transmitter operating cycle during which no valid signal can occur and thus reduces the incidence of erroneous indications.

Since this invention is directed primarily to measuring acoustic velocity over depth intervals of the order of 1 to 5 feet, the relatively long received acoustic pulses overlap in time and result in considerable difficulty where high accuracy is desired because of crossfeed between well logging cable conductor pairs. Accordingly, the present invention provides in combination with its other features a signal translation method whereby the received acoustic pulses, which have a duration of from 2 to 10 milliseconds, are translated into pulses of shorter duration, so that overlap does not occur and so that the translated pulses may be transmitted to the surface in a distinguishable manner for operation of the recorder.

Since the sampling features of the present invention inherently provide a high degree of accuracy, the invention further incorporates a digital counter for measuring the time intervals intervening between the reception of signals at two separate receivers and a digital-to-analog converter for operation of a pen recorder. The pen recorder, in turn, is used in combination with an oscillographic recorder to provide a reliable check on the operation of the entire system. With this recording arrangement, the inherent accuracy of the subsurface probe is not degraded in recordings.

In an alternative embodiment the present invention provides a method for producing a relatively smooth pen recorder trace by means of a high repetition rate transmitter pulse cycle while at the same time producing sampled data in the form of oscillograms for highly accurate computations of travel time between widely separated points within the borehole. This is accomplished by operating the transmitter at a fixed, relatively high repetition rate which provides several measurements for each depth interval, and by controlling an oscillographic recorder so that it records only signals representing preselected, evenly spaced depth intervals within the earth.

Furthermore, in the alternative embodiment receiver pulse translation is accomplished by a particularly simple and reliable circuitry which is readily adapted to measure intervals of the order of 1 to 2 feet. This is accomplished by connecting across a conductor pair of the well logging cable a switching device which is momentarily triggered to effect the charging of a capacitor, thus reducing the potential across the conductor pair momentarily to a very low value. The switching device is triggered in time relationship with the production of the second half cycle of the received pulse, thus providing a triggering mechanism of exceptional reliability and eliminating the need for a coupling pulse transformer which would broaden the produced pulse. Thus, there is produced for one or more of the received pulses a very narrow spike pulse marking the production of the second half cycle of the received acoustic pulse, and similarly there is produced a narrow spike pulse to mark the instant of the transmitter pulse. This transmitter signal demarking pulse is made larger than those which are responsive to receiver pulses and serves to arm the surface recorder, which thus discriminates against noise occurring at random times between transmitter pulses.

To provide convenience when comparing the pen recorder-plotted curve with the corresponding recorded oscillograms, the present invention provides an indication on the plotted curve of the depth at which sampled oscillogram measurements are recorded.

For a better understanding of the invention, reference is now made to the following description and to the accompanying drawings in which.

Figure 1:
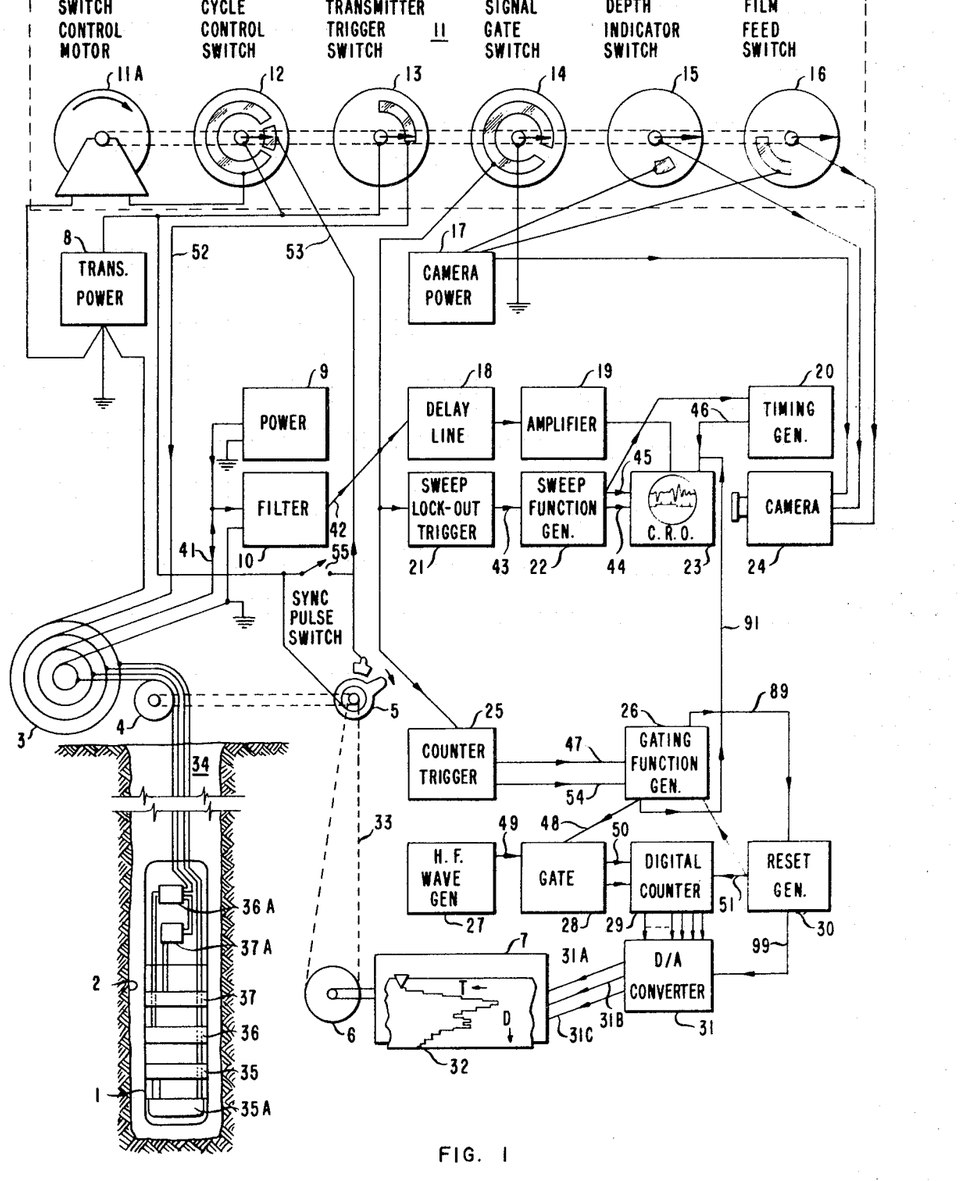
FIG. 1 is a schematic diagram of a preferred embodiment of apparatus according to the system of this invention, partly in block diagram form and showing the direction of travel of signals in the system.

Referring now to the drawings, a preferred embodiment of a system for practicing the present invention is illustrated in FIG. 1 wherein 2 is a borehole penetrating the earth. Within the borehole is a subsurface logging instrument or probe 1 which is lowered into and traversed through the borehole by means of a powered reel assembly indicated diagrammatically at 3. The subsurface instrument is suspended within the borehole by means of a well logging cable 34 which may contain two or more conductors. The well logging cable passes over sheave 4 after leaving the reel assembly upon which it is wound. As the cable passes over the sheave 4 it causes rotation of the sheave and of rotary switch 5 and of the chart mechanism 6, the latter being coupled to the sheave either mechanically, or by means of synchros.

The subsurface instrument 1 contains electronic transmitting pulse circuitry 35a, which is coupled to a transmitter transducer 35. It contains also receiving transducers 36 and 37, vertically separated by a distance of 5 feet and connected respectively to electric wave translating devices 36a and 37a. The electric wave translating devices 36a and 37a may comprise various types of control circuit means to prevent signal intermixing, as described in U.S. Pat. No. 2,708,485, or may comprise various types of amplifiers and trigger circuits as described in U.S. Pat. No. 3,062,314, or may comprise trigger circuits of the type described below with reference to FIG. 5. The transmitter circuitry 35a may be of any suitable type but in the preferred embodiment comprises capacitors which are charged to a high voltage when the circuitry is supplied with alternating current and which are discharged through transmitting transducer 35 upon the termination of the supplied alternating current. The required alternating current is supplied by means of conductor 52 in the well logging cable 34 and is periodically terminated; upon the termination thereof there is produced a transmitter energizing pulse which is supplied to transmitter transducer 35.

As the subsurface instrument is traversed through the borehole by rotation of reel 3 there are produced, as will be explained below, pulses of alternating current which are interrupted in response to the closing of rotary switch 5. Each time the alternating current pulses are terminated there is produced a transmitting transducer energizing pulse to cause the initiation of an acoustic pulse by means of the transmitting transducer 35. This acoustic pulse travels through the mud to the borehole wall along the borehole wall, and impinges successively upon receiving transducers 36 and 37, producing therein electrical wave pulses corresponding to the reception of the acoustic wave pulse traveling vertically in the earth. The successively received acoustic pulse causes the production by the receiving transducers 36 and 37 of electrical wave pulses which are translated by the electric wave translating devices 36a and 37a into a form suitable for transmission over the well logging cable 34 to the surface in a separable, distinguishable manner. As shown in FIG. 1, electrical power for energizing and controlling the elements contained within the subsurface instrument 1 are transmitted by means of conductors within the well logging cable 34. The conductors within the well logging cable 34 are connected at the surface to recording instruments by means of slip rings 3.

At the surface are located a transmitter power supply 8 and a receiving circuit power supply 9 connected to the subsurface instrument by means of ground return connections and by means of conductors 52 and 41, as shown in FIG. 1. Within the recorder there is incorporated a programmer 11 which may be of any suitable type as, for example, that commercially available from Industrial Timer Corporation, Newark 4, N.J. This programmer contains several switches which are successively actuated by means of a motor 11a. The switch contacts are diagrammatically represented by shaded circular segments, the relative lengths of which correspond to the fraction of the programmer cycle during which respective connections are made thereby. The arrow heads shown for the respective switches correspond to movable contacts which may connect with stationary contacts represented by shaded segments during the indicated portions of the programmer cycle. As illustrated in FIG. 1, the several rotary switches of the programmer are operated in synchronism by means of a shaft, or other mechanical coupling, rotated by the electric motor 11a. In FIG. 1 these switches are shown in a position corresponding to a condition in which rotary switch 5 has been open sometime.

The following describes a cycle of operation of the logging system under control of the programmer 11. The entire program initiated by the momentary closing of rotary switch 5, which is indicated in FIG. 1 as rotating in a clockwise direction. The dimensions of the sheave 4 and of the coupling elements by means of which the sheave is coupled to the rotary switch 5 and the chart recorder drive shaft 6 are such that each time the cable passing over the sheave lowers the subsurface instruments by an increment of 5 feet switch No. 5 closes momentarily and then in response to further rotation is opened. In general, rotary switch 5 is closed for a relatively small portion of the operating cycle.

It should be noted here that the spacing between the transmitter 35 and the receiving transducer 36 may be conveniently of the order of 5 feet, while the spacing between receiving transducers 36 and 37 may conveniently be equal to 5 foot, though longer or shorter spacing distances may be used. Thus, as the subsurface instrument is continuously raised or lowered through the borehole, there is produced by the closing of rotary switch 5 a pulse each time the subsurface instrument has its depth changed by an increment of 5 feet. When rotary switch 5 is momentarily closed, it supplies power to the programmer motor 11a through the contacts of rotary switch 12. When the movable contact of rotary switch 12 has moved past its resting position, it closes the circuit of switch 12 for a period of time corresponding to one rotation of the programmer shaft, as indicated in FIG. 1. Thus, when rotary switch 5 is momentarily closed and then opened, it causes for each such action one complete revolution of the programmer and the production of one complete operating cycle of the logging system. As shown in FIG. 1, rotary switch 13 is normally, in its rest position, i.e., closed and supplying therethrough alternating current power to the transmitter circuitry 35a of the subsurface instrument by means of conductor 52 and by means of the well logging cable. When rotary switch 5 is momentarily closed, thus initiating a programmer cycle, power to the transmitter circuitry 35a is interrupted by opening of the switch contacts of rotary switch 13. As described above, the termination of power transmission to the transmitter circuitry 35a results in the production of an energizing pulse which is supplied to transmitting transducer 35. This energizing pulse is produced after a slight delay of the order of one tenth of a second, as controlled by the time constants of the circuitry of 35a.

As indicated in FIG. 1, the conductor 41 is connected by means of slip rings and by means of the well logging cable 34 to electric wave translating devices 36a and 37a. Signals from the wave translating devices are transmitted, as indicated, through filter 10 to an output terminal 42. The normally closed contacts of programmer switch 14 are, in the rest position, connected in shunt between the output terminal 42 and ground, so that normally no signal will occur at output terminal 42. However, in response to the momentary closing of rotary switch 5 and the energizing of programmer motor 11, the switch contacts of rotary switch 14 are opened after a slight delay, as indicated in FIG. 1. Then the switch contacts of rotary switch 14 remain open for a short period of time, such as, for example, one fifth of a second, during which period the transmitting transducer 35 in the subsurface instrument is energized as described above. Thus, the circuitry of the surface recording instruments gates the received signals by means of signal gate switch 14 to accept receiver pulses as valid signals when the pulses occur within a predetermined time range following the synchronizing pulse produced by rotary switch 5; and, this circuitry rejects receiver pulses as representing invalid signal information, when these pulses occur outside the predetermined gating time range following the synchronizing pulse. During the time interval within which the signals are gated on at terminal 42, they are transmitted through delay line 18, through amplifier 19, and to cathode-ray oscilloscope 23, where they are displayed on a cathode-ray tube. The gated signals from terminal 42 are transmitted also, as indicated in FIG. 1, into a sweep lock out trigger 21. The sweep lock out trigger is a monostable trigger circuit with a period longer than the duration of received valid signals. For example, the period of sweep lock out trigger 21 may conveniently be of the order of 2 seconds, where the period of the programmer cycle is of the order of 2.5 seconds. The sweep lock out trigger thus produces one pulse for each received set of pulses from the subsurface instrument. This one pulse is transmitted into sweep function generator 22 by means of conductor 43. The sweep function generator is of conventional design, producing a monotonically increasing wave of voltage which is supplied by means of conductor 44 to cathode-ray oscilloscope 23 to produce therein a substantially linear sweep. The amplifier 19 controls the vertical deflection of the cathode-ray oscilloscope beam, and since the rate of increase of the monotonically increasing wave of voltage from sweep function generator 22 is known, it is possible to note on the face of the cathode-ray oscilloscope the indications of the magnitude of the monotonically increasing wave of voltage corresponding to reception of receiver signals and thus to measure the time intervening between the successive receptions of these signals at the receivers of the subsurface instruments. Furthermore, from sweep function generator 22 there is transmitted into cathode-ray oscilloscope 23 a square wave of voltage which serves to turn on the cathode-ray oscilloscope beam for the duration of the monotonically increasing wave of voltage and thus to produce a visible sweep and indications which may be recorded photographically. The square wave of voltage is transmitted from sweep function generator 22 to the cathode-ray oscilloscope by means of conductor 45. Also connected to conductor 45 is a timing generator which is controlled by the same square wave of voltage produced by the sweep function generator. This timing generator, in response to the production of the square wave of voltage from sweep function generator 22, produces a train of constant frequency pulses which are transmitted by means of conductor 46 into cathode-ray oscilloscope 23. Cathode-ray oscilloscope 23 has two beams and two sweeps, and thus on the face of this cathode-ray oscilloscope there are displayed not only indications of signals from the two receivers but also a train of constant frequency pulses produced in synchronism with the production of signals from the first receiver; this train of pulses thus provides an additional indication of the intervening time between reception of signals at the two receivers in the subsurface instrument, since on the face of the cathode-ray oscilloscope there is indicated the number of constant frequency pulses intervening between the reception of the respective signals at the two receivers in the subsurface instrument.

Depth indicator switch 15, which is part of the programmer assembly, produces a pulse after the recording of velocity data from the subsurface instrument, this pulse serving to energize a depth indicator within the camera 24. The camera 24 thus records not only the velocity information from the subsurface instrument but also an indication of the depth of the instrument at the instant of recording. Camera 24 is connected also to film feed switch 16, which, after completion of the recording and depth-indicating portion of the cycle, energizes the film transport mechanism to move into position an unexposed portion of film for the next operating cycle.

The terminal 42 of filter 10 is connected to a digital counter and pen recorder; the operation of which will now be described: The gated signal from terminal 42 passes first to counter 25 which comprises a voltage comparator and Schmidt trigger circuit whereby there are produced narrow voltage spikes with a width of the order of one third microsecond each time the waveform produced at terminal 42 goes through a chosen voltage level. Thus there is produced on conductor 47 a series of negative voltage pulses, one being produced for time, the wave form at terminal 42 passes through a chosen voltage level. There is produced on conductor 54 a series of narrow voltage spikes each time the waveform at terminal 42 passes through a preselected voltage level. From the counter trigger 25 the produced negative voltage pulses are transmitted by means of conductors 47 and 54 to gating function generator 26. The circuitry in gating function generator 26 is such as to produce a positive square wave of voltage of duration equal to the time intervening between the production of the first negative spike produced on conductor 47 and the second negative spike produced on conductor 54. The circuitry of gating function generator 26 may conveniently comprise a first and a second bistable trigger circuit. The first bistable trigger circuit being triggered on by the first negative spike transmitted thereto by means of conductor 47; the first bistable trigger circuit triggering in turn the second bistable trigger circuit at the instant of itself being triggered. The second bistable trigger circuit is then triggered off by the second negative voltage pulse transmitted thereto by means of conductor 54. The first bistable trigger circuit is later reset to its initial condition as will be explained below. Thus the second bistable trigger circuit produces a square wave of voltage the duration of which corresponds to the triggered on time of the second bistable trigger circuit, which in turn corresponds to the time intervening between the production of the first negative pulse on conductor 47 and production of the second negative pulse on conductor 54.

There is transmitted into gate 28 a continuous series of high-frequency constant-frequency waves from high-frequency wave generator 27. The square wave of voltage produced by gating function generator 26 is transmitted into gate circuit 28 by means of conductor 48. There is then produced on conductor 50 from the output of gate circuit 28 a train of constant-frequency, high-frequency waves of duration equal to the duration of the square wave of voltage transmitted by means of conductor 48 into gate 28. Thus, the number of high-frequency waves produced on conductor 50 is directly proportional to the duration of the square wave produced on conductor 48. This train of high-frequency waves is transmitted by means of conductor 50 into digital counter 29. Digital counter 29 if of conventional design comprising a number of bistable trigger circuits which are alternately triggered and reset whereby there is produced in digital counter 29 for any given number of input waves from conductor 50 a certain pattern of triggered and reset bistable trigger circuits corresponding to the number of waves transmitted on conductor 50.

The bistable trigger circuits contained within digital counter 29 are in turn respectively connected to a number of relays in digital-to-analog converter 31. These relays in turn, in a conventional manner well known to those skilled in the art, control the interconnections of a matrix of resistors whereby there is produced an electrical quantity representing the time interval intervening between reception of acoustic pulses at the subsurface receivers 36 and 37. This electrical representation may consist of the ratio of the resistance between output leads 31A and 31B on the one hand and between output leads 31A and 31C on the other hand. The output leads 31A, 31B and 31C in turn are connected to a slide wire pen recorder 7 wherein there is produced a deflection of the pen controlled by the ratio of the resistance values above noted. And thus, there is produced on a chart record 32 a plotted curve which contains individual line segments, each segment corresponding to the production of one measurement in response to the momentary closing of rotary switch 5, the horizontal displacement of each line segment from a reference line on the right-hand edge of the chart is then proportional to the travel time of an acoustical pulse between the receivers 35 and 36 in the subsurface instrument when there are at the depth for which rotary switch 5 makes a momentary contact. The chart drive mechanism of pen recorder 7 is coupled mechanically as noted above to the sheave 4 so that the motion of the chart through the recorder is controlled by and is proportional to the rate of traverse of the subsurface instrument in the borehole. In this way the recording chart has a depth scale carrying a known relationship to the depth of the instrument at all times. In practice depth scale horizontal lines are printed on the chart, though for simplicity, they are not shown in FIG. 1.

The reset generator 30 circuitry comprises bistable and monostable trigger circuits. The monostable trigger circuit is of a relatively long period. It is triggered on by means of a pulse produced in time coincidence with the trailing edge of the square wave produced by gating function generator 26: this pulse being transmitted by means of conductor 89 into reset generator 30. In reset generator 30 there is produced a pulse in time coincidence with the trailing edge of a square wave of voltage transmitted from the relatively long period monostable trigger circuit contained within reset generator circuitry 30. This pulse is in turn transmitted from terminal 51 of reset generator 30 to gating function generator function 26 and to digital counter 29 and in both these units causes the resetting of the contained bistable trigger circuits to their initial condition. There is produced in reset generator 30 also a pulse in time coincidence with the trailing edge of the square wave of voltage produced by gating function generator 26. This pulse is in turn transmitted by means of conductor 99 to digital-to-analog converter 31 wherein it causes the relay circuits therein to be changed from a prior combination of conducting and nonconducting conditions whereby the electrical representation of the prior measured time interval is erased and a new electrical representation of a newly measured time interval is stored within the digital-to-analog converter 31 to be transmitted therefrom for recording to pen recorder 7. Thus, the digital-to-analog converter 31 after being presented with data or electrical information as to the time interval elapsing between reception of signals at receivers 36 and 37 will store or hold this information until presented at a later time with newly acquired valid information.

Figure 2:
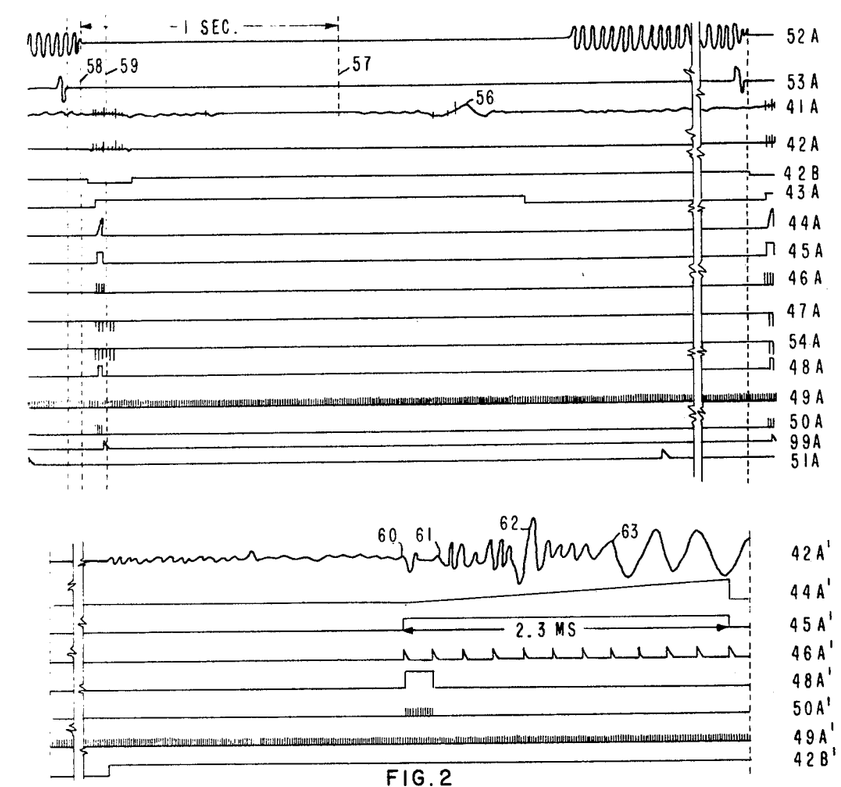
FIG. 2 is a series of diagrammatic representations of waveforms produced at various points in the system of FIG. 1.

Referring now to FIG. 2, there are shown waveforms as produced at various points in the system and circuitry of FIG. 1. In some respects the waveforms of FIG. 2 are shown approximately to scale, namely, in the following respects: That the instants of inception of the various waves are placed on the horizontal time scale in positions which correctly indicate the relative order of their production during the measuring cycle. At 52A is illustrated the waveform of the alternating current power transmitted by means of conductor 52 to the transmitter circuitry 35A in subsurface of instrument 1. At 53A is illustrated the synchronizing pulse of alternating current voltage produced in response to momentary closure of rotary switch 5 which occurs at selected constant depth increments as the subsurface instrument is traversed through the depth of the borehole.

In response to rotation of the sheave 4 over which the well logging cable passes during traverse of the borehole by the downhole tool, pulses are produced at depth increments of 5 feet by the rotary switch 5. The horizontal time scale of FIG. 2A is indicated by the horizontal distance between dotted lines 58 and 57 which are separated by distance corresponding to a time interval of one second as indicated on FIG. 2. At 41A is illustrated diagrammatically the waveform of well logging signals transmitted by means of conductor 44 to filter 10. For the waveform 41A the position of the inception of the received signals is shown to scale. However, the frequency of the well logging signals produced by subsurface receivers and transmitted by means of conductor 41 are so high as compared to the frequency of the alternating current power used for energizing the subsurface transmitter circuitry that the individual cycles are shown only diagrammatically and the periods thereof are not illustrated to scale at 41A. For example, the received signals are indicated by means of a convention in which a positive and a succeeding negative half cycle are represented by vertical line segments extending above and below horizontal zero reference level. In trace 41A there is shown at 56 a low-frequency noise pulse produced in response to acoustic noise in the borehole. Also shown riding upon this low-frequency noise are several cycles of energy with frequency of the order of that of well logging signals. In general it will be noticed that on trace 41A there are shown not only valid signals in the vicinity of dotted line 39 but also noise signals which occur at other instants during the measuring cycle.

At 42A is shown the waveform of the voltage appearing at terminal 42 which is the output of filter 10. Here we see that the high-frequency content of well logging signals produced on conductor 44 are preserved but are gated by switching action. At 43A is illustrated the waveform at the output of sweep lock out trigger 21. It will be seen that this is a square wave of voltage, the leading edge being produced substantially in time coincidence with the second half cycle of received valid signals from the subsurface well logging receivers, and the trailing edge being produced at an instant about one and three-quarter seconds later than the production of the first cycle of valid signals from the subsurface receivers.

At 44A is illustrated the waveform of the monotonically increasing wave of voltage produced by sweep function generator 22 and transmitted to cathode-ray oscilloscope 23 by means of conductor 44. It will be noted that this monotonically increasing wave of voltage is produced substantially in time coincidence with the production of the second half cycle of received valid signals from the subsurface receivers and has a duration of approximately 1.5 milliseconds.

At 45A is shown the square wave of voltage produced on conductor 45 by sweep function generator 22. It will be noted that this square wave of voltage has a duration substantially equivalent to that of the monotonically increasing wave of voltage shown on trace 44A. Here it should be noted that the monotonically increasing wave of voltage at 44A and the square wave of voltage 45A are not shown as to their duration to a correct time scale, since this would make their horizontal extent so small as to be imperceptible in FIG. 2. And at 54A are illustrated the negative narrow voltage pulses produced on conductors 47 and 54 respectively by the counter trigger as the received subsurface receiver signals pass in succession through voltage levels selected in the comparator of counter trigger 25.

At 48A is shown a positive square wave of voltage produced by gating function generator 26 and transmitted to gate 28 by means of conductor 48. The beginning of this square wave of voltage is produced in time coincidence with the production of the second half cycle of received valid signals from the subsurface receivers and furthermore in time coincidence with the production of the first negative pulse of voltage as illustrated at 47A produced in response to the second half cycle of received valid signal passing through the selected voltage level in the comparator of counter trigger 25. The trailing edge of this square wave of voltage is produced in response to the production of the second half cycle of valid signal from the farthermost receiver of the subsurface instrument 1, and furthermore is produced in time coincidence with the production of the second negative pulse illustrated at 54A, transmitted by means of conductor 54 from counter trigger 25 to gating function generator 26. Thus, the square wave of voltage produced by gating function generator 26 on conductor 48 has a duration equal to the time intervening between reception of the second half cycle of received valid signal at the first receiver of the subsurface instrument 1 and reception of the second half cycle of received valid signal at the second receiver 37 of subsurface instrument 1.

At 50A is shown a train of constant-frequency, high-frequency pulses produced upon conductor 50 from gate 28 in response to the transmission into gate 28 of the square wave of 48A and high-frequency waves transmitted into gate 28 by means of conductor 49 from high-frequency wave generator 27. As explained above the duration of this train of waves is equal to the time intervening between the reception of acoustic signals at the first and second receivers 36 and 37 respectively of subsurface instrument 1 during traverse thereby of the borehole 2. Furthermore, the number of high-frequency waves contained within this wave train is, as explained above, proportional to the travel time between the two receivers.

At 49A is shown the high-frequency constant-frequency wave produced by high-frequency wave generator 27 continuously during the operation of instruments, this wave being fed by means of conductor 49 into gate 28.

At 99A is shown the reset pulse produced by reset generator 30 in time relationship with the termination of the gating square wave illustrated at 48A whereby the digital-to-analog converter 31 has its condition changed from prior condition to a new condition representing a newly measured time interval. Thus, we see that the digital-to-analog converter is reset very soon after the completion of a counting or measuring cycle by the counter 29, which counts the number of high-frequency constant-frequency waves produced during the duration of a gating pulse as illustrated at 48A.

At 51A is illustrated the reset pulse produced by reset generator 30 and the long period monostable trigger therein, at output terminal 51 which transmits reset signals to the gating function generator 26 and digital counter 29. Thus we see that, in addition to the gating action provided by signal gate switch 14, there is also provided a gating mechanism whereby the digital counter 29, and gating function generator 26 are, after once being triggered, reset only shortly before the time during which a valid receiver signal may be received from the subsurface instrument.

Shown at the bottom of FIG. 2 there are shown again certain waveforms on an expanded scale wherein the full scale corresponds to only the portion of the signal between lines 58 and 59 in the upper portion of FIG. 2. Thus, there are shown at 42A', 44A', 45A', 46A', 48A', 50A', 49A' and 42B' the waveforms illustrated above at 42A, 44A, 45A, 46A, 48A, 50A, 49A and 42B respectively. These latter waveforms are shown approximately to scale, the scale being quantitatively indicated by the fact that the duration of the square wave of 45A' is 2.3 milliseconds. Since the scale employed is still not followed exactly, the principle frequencies involved for some of the waveforms are set forth below. The valid signals produced by the subsurface receivers 36 and 37 consist of waves of several velocities. At 60 is shown the wave traveling with compressional wave velocity and thereby first impinging upon receiver 36. This wave has a frequency of the order of 15 kilocycles. At 61 is shown the first wave impinging upon receiver 37, this wave also is a compressional wave traveling with a velocity of compressional wave having a frequency of the order of 15 kilocycles.

At 62 is shown a wave which travels through the earth with the velocity approximating that of shear waves in the earth and which impinges upon receiver 37 after the impingement thereupon of the initial or compressional wave. This wave travels with approximately sheer wave velocity and has a frequency of the order of 15 kilocycles. At 63 is shown a late arriving wave, sometimes identified as a tube wave, which has a frequency of the order of 3,000 cycles. The duration of the monotonically increasing wave of voltage 44A is 2.3 milliseconds as is true for the square wave of voltage illustrated at 45A'.

The period of the constant-frequency, high-frequency wave illustrated at 46A' is 200 microseconds, as the frequency of these waves is 5 kilocycles. The duration of the square wave of voltage shown at 48A' is equal to the time intervening between reception of first compressional wave, that is, the second half cycle thereof, at the two receivers in the subsurface instrument and is of the order of 250 microseconds. The duration of the constant-frequency, high-frequency waves illustrated at 50A' is also of the order of 250 microseconds. The frequency of the constant-frequency, high-frequency waves illustrated at 49A' is of the order of 1 megacycle.

The trace shown at 42B and 42B' does not represent a voltage waveform but rather indicates the condition of full transmission or zero transmission from terminal 42 as controlled by the open or closed contact condition of signal gate switch 14. For trace 42B and 42B' the upward direction corresponds to transmission and the downward direction or negative direction corresponds to zero transmission. Thus these waveforms indicated by the position of the square waves shown therein the portion of the recording cycles during which there is transmission from the terminal 42 into various units to which it is connected.

At 42A' and at 46A' is illustrated the waveform of the voltage produced by timing generator 20, that is, initiated in time coincidence with the production of the second half cycle of received valid signal 60 from subsurface receiver 36. This timing wave, of course, is recorded in such a way as to indicate the number of cycles and fractional cycles occurring between the reception of the second half cycle of received signal of receiver 36 and the corresponding second half cycles of received signal of receiver 37.

Figure 3:
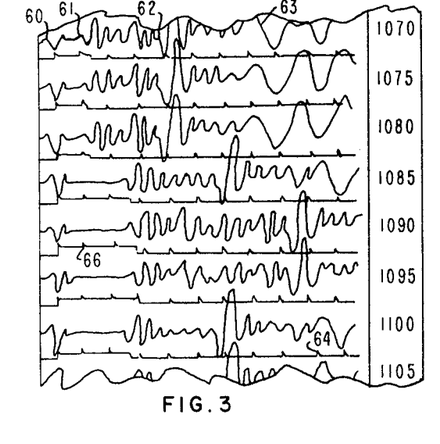
FIG. 3 is a portion of the film record of oscilloscope traces produced by the system of FIG. 1.
Figure 4:
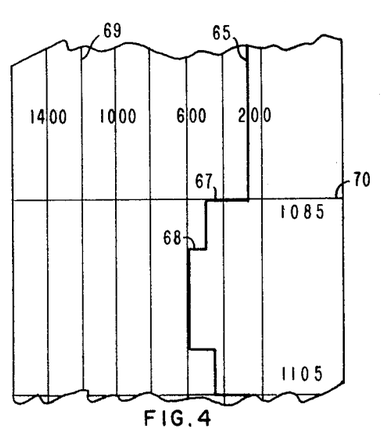
FIG. 4 is a portion of the pen recorder record produced by the system of FIG. 1.

At FIG. 3 is shown an illustration of the oscillographic record produced by the apparatus of FIG. 1. Here there are shown the various waves impinging upon receivers 36 and 37 as discussed above. Also a cathode-ray tube trace, as at 66, which is recorded below the signal trace and which is periodically vertically deflected by the timing generator to provide accurate measurement and continuous calibration of the system. Also, as indicated at 66, this timing trace carries a positive square wave of duration equal to the positive square wave produced by gating function generator 26. Thus there is provided on the record a calibration thereof and also an indication of the time interval measured by the digital counter 29 and recorded by the associated recording circuitry and instrument. In FIG. 4 is illustrated the pen recorder record produced by recorder 7. The horizontal time scale is indicated by vertical lines as at 69, a segmented recorded trace is illustrated at 65; and the horizontal depth scale lines at 70, indicating the depth of the instrument at corresponding recording points. In a corresponding manner there are depth numbers photographed adjacent the corresponding traces to indicate the depth of the instrument at the instant respective traces are photographed on the record of FIG. 3. By comparing the two records it is relatively easy to determine whether the circuitry producing the pen recorder trace of FIG. 4 is operating correctly during the recording process and the logging operation. For example, at a depth of 1,095 the oscillogram recording indicates that the digital counter has measured a time interval of 600 microseconds. Examining FIG. 4, we note that indeed at this depth the digital counter has controlled the pen recorder to produce a trace deflected to the 600 microsecond line, and therefore, the instruments were operating correctly during production of the record.

The above-described embodiment is preferred because of its simplicity. It should be noted in connection with this embodiment that certain portions of the apparatus may be of commercial design and construction and that these units are readily available commercially. For example, the counter trigger 25, gating function generator 26, high-frequency, constant-frequency generator wave generator 27, gate 28, digital counter 29 and reset generator 30 are readily available assembled into a single unit. For example, these elements may be a Berkeley Scientific Corporation instrument Model No. 5510. Furthermore, digital-to-analog converter 31 may be a Berkeley Scientific Corporation instrument Model No. 1445-2. Similarly, pen recorder 7 may be a commercially available slide wire recorder available from instrument companies such as Brown Instrument Company, whose instrument is trade names "Electronik."

The system of FIG. 1 described above thus provides depth recorded measurements made at predetermined depths by controlling pulses fed into subsurface transmitting circuitry. The system of FIG. 1 further provides gating of the recording instrumentation after the production of a synchronization pulse to reduce the incidence of erroneous recording. There is furthermore provided translation of receiver signals to prevent intermixing of the separate receiver signals, when these are used to control a digital counter for measuring the time interval between reception of valid receiver signals. There are also provided in combination with the digital counter a digital-to-analog converter and pen recorder for the convenient production of a pen recorder trace on a chart, which is provided in turn with time and depth scales. Furthermore, there is provided an oscillographic record in combination with the pen recorder record, on which are recorded signals from the subsurface receivers and the translations thereof, and also, simultaneous indications of the operation of the digital counter.

Figure 5:
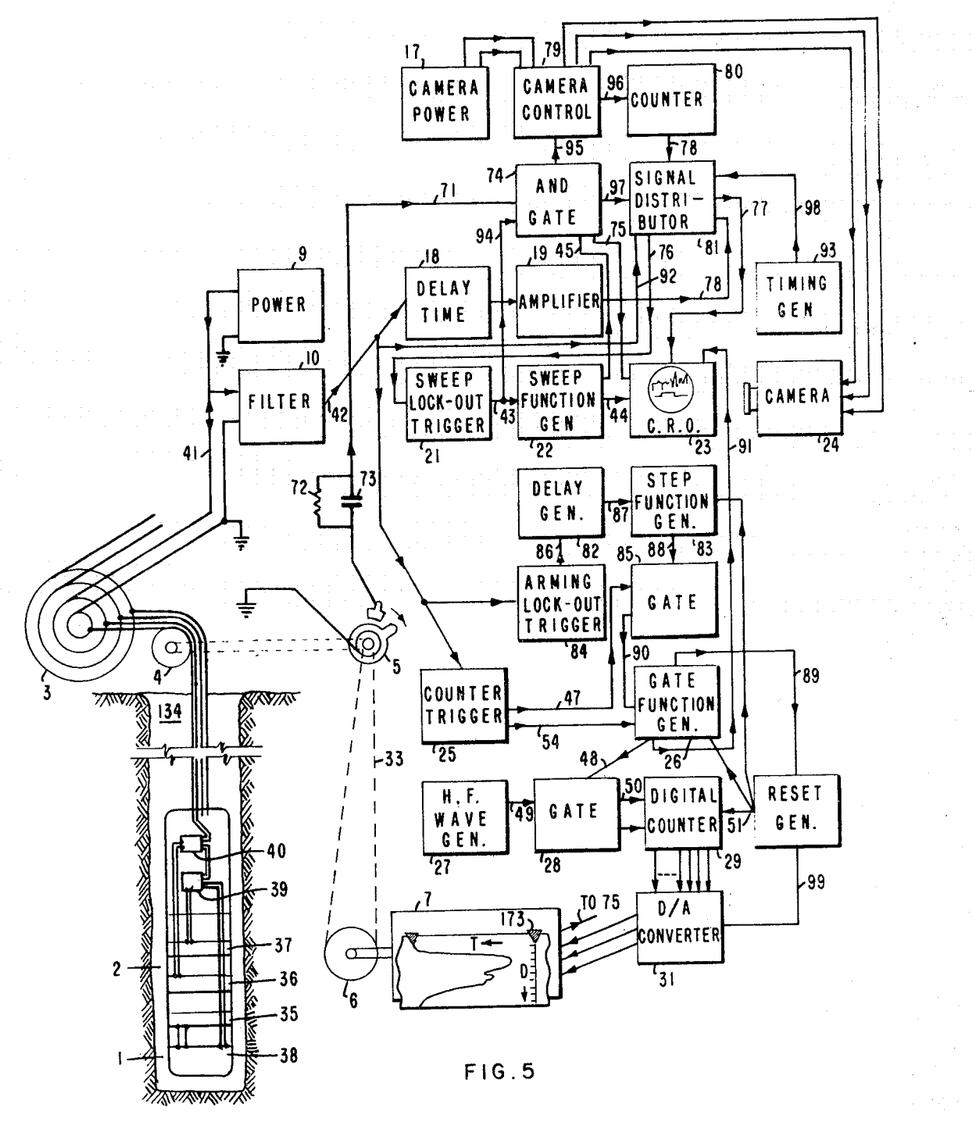
FIG. 5 is a schematic diagram of an alternative embodiment of apparatus according to the system of the invention, partly in block diagram form and showing thereon the direction of travel of signals in the system.

With reference now to FIG. 5, there will be described an alternative embodiment of the present invention which, although more complex, provides certain refinements not incorporated in the simpler embodiment illustrated in FIG. 1. The system of FIG. 5 is in some ways similar to that of FIG. 1. In this system there is lowered into a borehole a subsurface instrument 1 which comprises transmitting and receiving transducers and circuitry, wave translating devices and a suspending well logging cable 34. In the subsurface instrument, 38 is a subsurface transmitter circuitry, 35 is a transmitting transducer, 36 is a near receiving transducer, 37 far receiving transducer, 40 is a wave translating device connected to near receiver 36, 39 is a wave translating device connected to far receiver 37. As illustrated in FIG. 5 the instrumentation requires only a single pair of conductors in the well logging cable 34 though it is clear that circuitry utilizing more than a single pair of conductors may readily be evolved from that described herein.

The wave translating devices incorporated in the system of FIG. 5 may be as earlier described above with reference to FIG. 1; however, they are preferably of an improved type to be described below. The subsurface instrument, as mentioned above, is lowered into the borehole by means of a well logging cable 34 which passes over sheave 4, and which is electrically connected to slip rings 3 and thence to ground connections and to power supply and filter connections. Mechanically coupled to sheave 4 are a rotary switch 5 and a chart drive shaft 6. These are so coupled to the sheave 4 that each time the subsurface instrument moves through an incremental depth interval of 5 feet the rotary switch 5 closes its contact and also the chart of pen recorder 7 is moved vertically a distance corresponding on its depth scale to a depth of 5 feet.

In the system of FIG. 5 the transmitter circuitry 38 is different from that employed in the system of FIG. 1, because the transmitter circuitry is adapted to continually produce energizing pulses which are transmitted to transmitter transducer 35. Thus, as this instrument is moved, or if it remains stationary in the borehole, there is continually produced a series of transmitted acoustic wave pulses spaced in time by substantially constant intervals of the order of three-tenths second; that is to say, transmitting transducer 35 in the system of FIG. 5 produces acoustic wave pulses at the rate of about 3 per second irrespective of whether the instrument is traversing the borehole or is stationary.

Similarly, the wave translating devices 39 and 40 of FIG. 5 are quite different from wave translating devices of 36A and 37A of FIG. 1.

Figure 7:
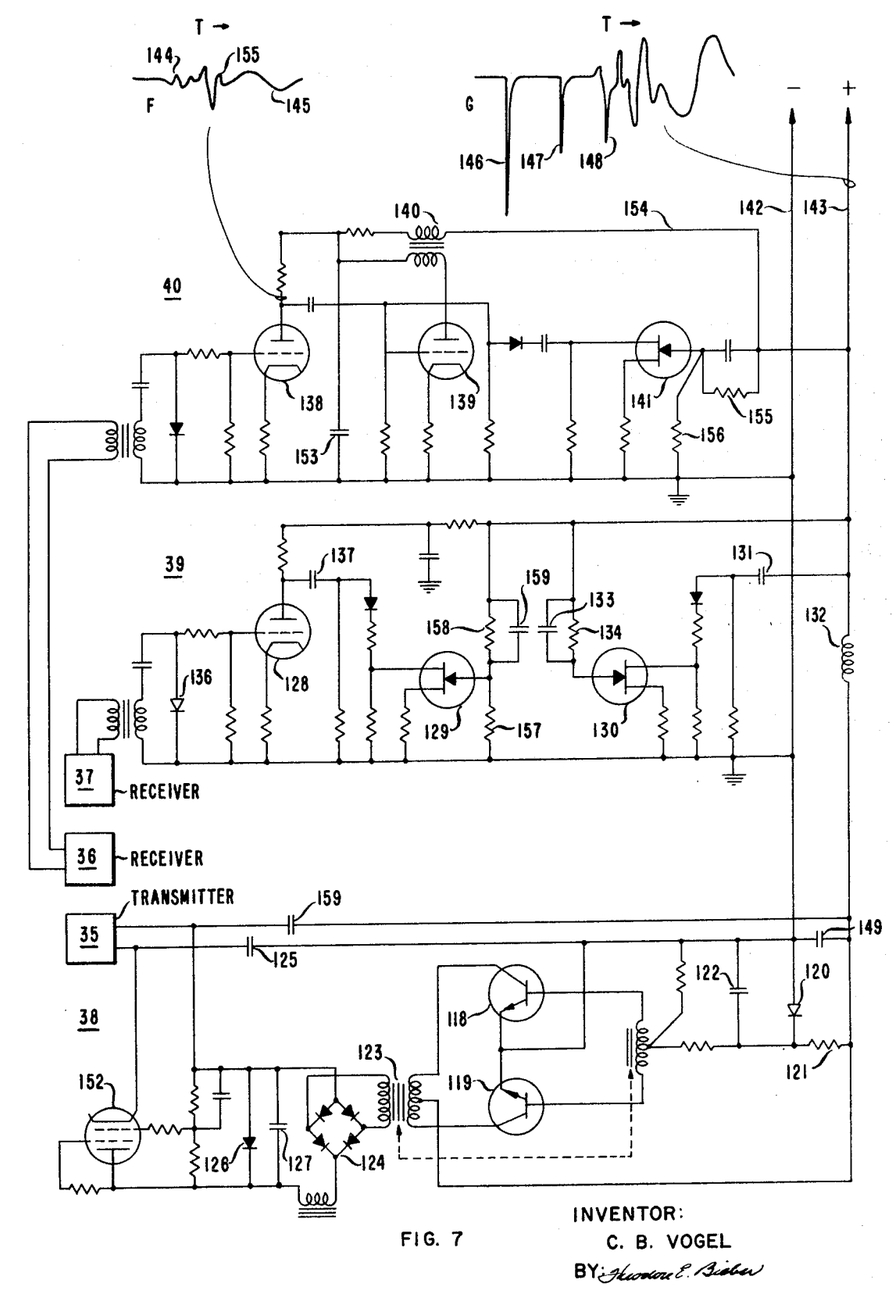
FIG. 7 is a detailed schematic wiring diagram of circuitry for the downhole instrument used in the system of FIG. 5.

Referring now to FIG. 7, there are shown more detailed wiring diagrams of the circuitry indicated by blocks 38, 39 and 40 of FIG. 5. In FIG. 7, we see at 38 the transmitter transducer energizing circuitry. Here a pair of transistors 118 and 119 are connected into a self-excited power oscillator circuit which drives a step-up transformer 123. The transistor oscillator in turn is powered from well logging cable conductor 143 to which there is transmitted from the surface power supply a voltage of the order of 120 volts. This voltage in turn is reduced by means of resistor of 121 and Zener diode 120 which serves to stabilize the input voltage to the transistor oscillator, so that it will not vary as the temperature of the well logging cable and its resistance vary in use. Capacitor 122 serves as a filter to minimize the effects of the current fluctuations resulting from periodic firing of the transmitter circuits. Connected to the high voltage side of transformer 123 is a bridge rectifier which feeds an energy storage capacitor 127. The energy storage capacitor 127 is connected to transmitting transducer 35 by means of a switching device such as a thyratron 152. In operation, as the transistor oscillator continues production of alternating current to the input of transformer 123 there is built up across energy storage capacitor 127 a gradually increasing wave of voltage. When this voltage reaches a certain critical value, the switching device, thyratron 152, breaks down, thus charging capacitor 127 through the winding of a toroidally wound cylindrical magnetostriction transducer as illustrated at 35. The acoustic wave pulse produced in response to current in the transducer winding travels out through the mud into the earth surrounding the borehole, travels vertically up the borehole and impinges in succession upon the two receivers as we shall see below.

Referring to FIG. 7, there is illustrated the detailed circuit of wave translator device 40 which is connected to the nearest of the two transducers, i.e., transducer 36. The operation of wave translation device 40 is as follows: It comprises, first of all, an amplifier which may be a vacuum tube amplifier 138, which is connected to the transducer 37 by means of an impedance matching transformer across which are connected a shunt resistor and a clipping diode. The vacuum tube amplifier 138 serves as a voltage amplifier and is connected in turn with a second vacuum tube amplifier 139 which serves as a power amplifier. The power amplifier 139 is connected by an impedance matching amplifier 140 to the well logging cable between cable conductor 143 and the high side of bypass capacitor 153. The low side of bypass capacitor 153 is connected to the ground; so in this way the impedance matching transformer connects the output of the power amplifier 139 directly between the cable conductors 143 and 142 as to signal frequencies. The output of voltage amplifier 138 is also connected, by means of a rectifier and capacitor, to a semiconductor switching device such as to a silicon-controlled rectifier 141. This silicon-controlled rectifier in turn has its output circuit connected between the ground return and cable conductor 143. There is connected in series between the cable conductor 142 and the silicon-controlled rectifier a capacitor 154. The waveform of the voltage fluctuations produced on the plate of the vacuum tube amplifier 138 are illustrated at F and comprise a compressional wave arrival 144, a shear wave arrival 155 and a very slow, or tube, wave arrival 145. When the second half cycle of the compressional wave arrival reaches a sufficiently high level at the plate of triode amplifier 138 it causes triggering of the silicon-controlled rectifier 141, causing sudden charging of the capacitor 154, thereby shorting out momentarily the cable conductors 142 and 143; and producing on cable conductor 143 a negative pulse of voltage of large amplitude. Thus, the output voltage waveform due to signals received from the receiver transducer 37 are as indicated in the vicinity of 148 of waveform G, FIG. 7. The first half cycle of the received compressional wave train at transducer 37 is reproduced and is followed by a large negative spike pulse produced in response to the second half cycle of the compressional wave train having exceeded a certain critical level required to trigger the silicon-controlled rectifier at 141.

At 39 in FIG. 5 is shown the wave translation device which is connected to receiving transducer 37 and which translates a voltage wave from the transmitter 38. Here we see that receiving transducer 37 is connected to triode or vacuum tube amplifier 128 by means of an impedance matching transformer, across which are shown a clipping diode 136 and a resistor. We see that the output of voltage amplifier 128 is connected to the input of a silicon-controlled rectifier circuit, which is described above with reference to wave translator 40. We see that the silicon-controlled rectifier circuit, utilizing silicon-controlled rectifier 129 has connected between its anode and ground a resistor 157. We see that there is a similar resistor in the circuit of silicon-controlled rectifier 141. These resistors 156 and 157 in combination with resistors 155 and 158 control the voltage upon capacitors 159 and 154 at the instant of triggering of the silicon-controlled rectifier and thus control the amplitude of the negative spike produced on the well logging cable, and in effect reduce the amplitude of this spike from the maximum value that it might have were resistors 156 and 157 omitted.

Now, when the second half of the received signals from transducer 37 exceeds a certain value on the plate of vacuum tube amplifier 128, it causes a triggering into conduction of the silicon-controlled rectifier 129 and thus produces a negative spike of voltage across the cable conductors in a manner as described above with reference to the silicon-controlled rectifier 141 and its associated circuitry. The negative spike produced in response to the second half cycle of received signal of receiver transducer 37 is illustrated at 147 of the waveform G in FIG. 5. Also shown as part of wave translator 39, there is illustrated a third silicon-controlled rectifier trigger circuit, in which is included a silicon-controlled rectifier 130 and capacitor 133 and resistor 134. Since there is no resistor connected between the anode of silicon-controlled rectifier 130 and ground, the capacitor 133 in this circuit is discharged to a very low value by means of resistor 134 before the instant of triggering of the silicon-controlled rectifier 130. For the silicon-controlled rectifier circuitry including silicon-controlled rectifier 130 the input pulse is provided by means of capacitor 131 from the lower end of the circuit of cable conductor 143, which is isolated by means of inductor 132. Thus, there is coupled from transmitting transducer 35 by means of capacitor 159 and capacitor 131 a voltage pulse produced at the instant of firing of the thyratron 152. This voltage pulse is further transmitted by means of a diode to the control element of silicon-controlled rectifier 130 and causes the triggering into conduction thereof. Furthermore, since there is no resistor connected between the anode and ground of silicon-controlled rectifier 130 the negative pulse produced across the cable conductor pair by the sudden charging of capacitor 133 is of larger amplitude than those produced in response to the production of the second half cycles of receiver signals at receivers 136 and 137.

We see at G the composite waveform produced across the cable conductor pair by the wave translation devices 39 and 40. This waveform comprises first at 146 a very large negative pulse produced in time correspondence with production of the emitted acoustic wave pulse. It comprises further negative spike pulse 147 produced in time correspondence with the production of the second half cycle of received acoustic waves at receiving transducer 36. It consists of a first half cycle of received energy at receiving transducer 37, a negative pulse 148 produced in response to the production of the second half cycle of received energy at receiving transducer 37, and it comprises furthermore the remainder of the waves detected by the receiver 37. These waves are transmitted by means of the conductors 142 and 143 up the well logging cable and to the surface recording instruments.

Referring back now to FIG. 5 it should be noted that in the system of FIG. 5 the programmer 11 of FIG. 1 has been omitted and that the need for it has been substantially eliminated by the provision of the following units which comprise a sampling circuit assembly, namely camera control unit 79, counter 80, and gate 74, and signal distributor 81. Furthermore it is noted that there has been added in FIG. 5 over and above the circuitry of FIG. 1, the following elements which control operation of the digital counter 29 and associated units. The units which have been added thereto comprise the following: the delay generator 82, the step function generator 83, the arming lockout trigger 84, the gate 85. These four units comprise an arming circuit assemble which effectively reduces the effects of erroneous noise pulses in a manner different from that of the gating mechanisms incorporated into the system of FIG. 1.

Figure 8:
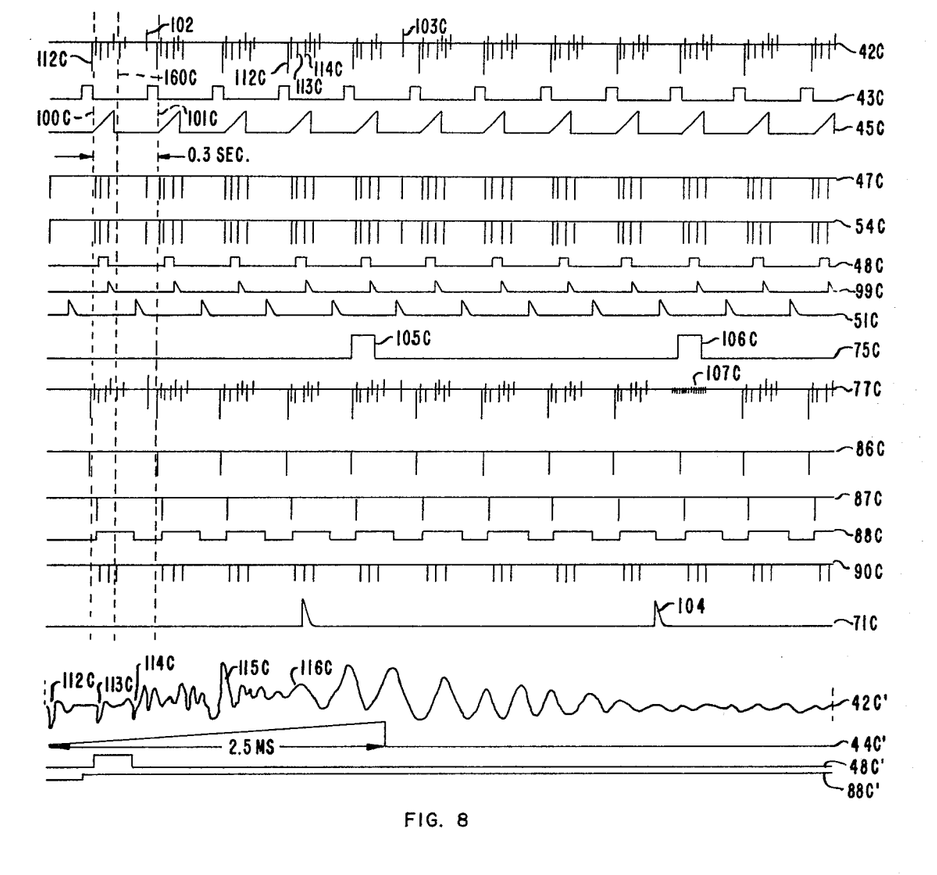
FIG. 8 is a series of diagrammatic illustrations of waveforms produced at various points in the system of FIG. 5.

The sequence of operations of the system of FIG. 5 will not be described. Reference will be made in this description to FIG. 8 wherein the waveforms are numbered the same as the conductor in FIG. 5 followed by the suffix C. Signals produced by the downhole instrument are transmitted into the filter 10; thence to its output terminal 42 where they have a waveform as at 42C; and thence are connected in parallel to the delay line 18, and by means of conductor 92 to the signal distributor 81. The signal from the subsurface instruments passes through the delay line 18, the amplifier 19, and the signal distributor 81, to the vertical deflection circuitry of the cathode-ray oscilloscope 23 being connected to the oscilloscope by conductor 77. Signals from the subsurface instrument and the filter 10 are also transmitted by means of conductor 92 into the signal distributor 81 and thence by means of conductor 76 into sweep lockout trigger 21. In response to transmitter arming spike pulse 112C sweep lockout trigger 21 then produces a negative square wave of voltage as at 43C. This square wave of voltage is differentiated and transmitted by means of conductor 43 into sweep function generator 22 where it causes the production of one monotonically increasing wave of voltage which is illustrated at 44C, though not to true time scale. This monotonically increasing wave of voltage is transmitted by means of conductor 44 to the horizontal deflection circuits of cathode-ray oscilloscope 23 whereby it produces on the face of the cathode-ray tube a linear sweep for displaying the signals from the subsurface instruments. The sweep function generator 22 also produces in time coincidence with the production of the monotonically increasing wave of voltage 44C a positive square wave of voltage not illustrated which is transmitted by means of conductor 45 into AND-gate 74 and thence to the beam brightening circuits of the cathode-ray oscilloscope 23, whereby the cathode-ray tube beam is turned on during the production of the monotonically increasing wave of voltage, provided certain conditions are met within the AND-gate 74 to allow the application of this square wave of voltage to the beam brightening circuits.

As the substrate instrument is moved in a transversing motion vertically through the extent of the borehole, rotary switch 5 rotates, periodically closing its contacts and causing the production of a current pulse in conductor 71 which production is caused by the sudden charging of capacitor 73 when the rotary switch 5 is momentarily closed. The purpose of resistor 72 is to cause discharge of capacitor 73 in between instants of momentary charging. This construction of AND-gate 74 is such that upon the transmission thereinto in proper sequence of a current pulse from conductor 71 and a pulse from sweep lockout trigger 21 and a pulse from sweep function generator 22, there is produced at its output on conductor 75 a positive square wave of voltage for turning on the cathode-ray tube beam of the cathode-ray oscilloscope 23. This output square wave of voltage from the AND-gate 74 is illustrated at 75C of FIG. 6 by square waves 105C and 106C. The current pulses produced in conductor 71 at the instants of momentary closure of the contacts of rotary switch 5 are illustrated at 71C, for example by the pulse 104C. Thus the cathode-ray tube beam is not brightened each time there is produced a monotonically increasing wave of voltage at 44C in response to the production of a transmitter arming pulse as at 112C; rather the beam brightening pulse is transmitted upon conductor 75 to the cathode-ray oscilloscope for beam brightening purposes only after the occurrence of a depth synchronized pulse in conductor 71 and only after one monotonically increasing wave of voltage has been completed following the production of a depth synchronizing current pulse. Thus the beam is never brightened during the production of a monotonically increasing wave of voltage, but only in such a way that the beam is brightened for the duration and for the entire duration of one entire monotonically increasing wave of voltage for each depth synchronizing pulse. Since the repetition rate of the subsurface transmitter circuitry is relatively high being of the order of three acoustic pulses per second, the recorded beam brightened traces on the cathode-ray oscilloscope are produced substantially at the depth at which depth synchronizing pulses of current are produced; thus although the subsurface transmitter circuitry produces a relatively large number of acoustic wave pulses for each foot of hole depth logged, there is recorded on the cathode-ray oscilloscope only one brightened sweep trace for each depth at which the rotary switch 5 makes a momentary contact. Thus, the recorded oscillogram record has a substantially constant depth scale, substantially accurately synchronized with the instant ate which the rotary switch contact produces synchronizing pulses.

Figure 6:
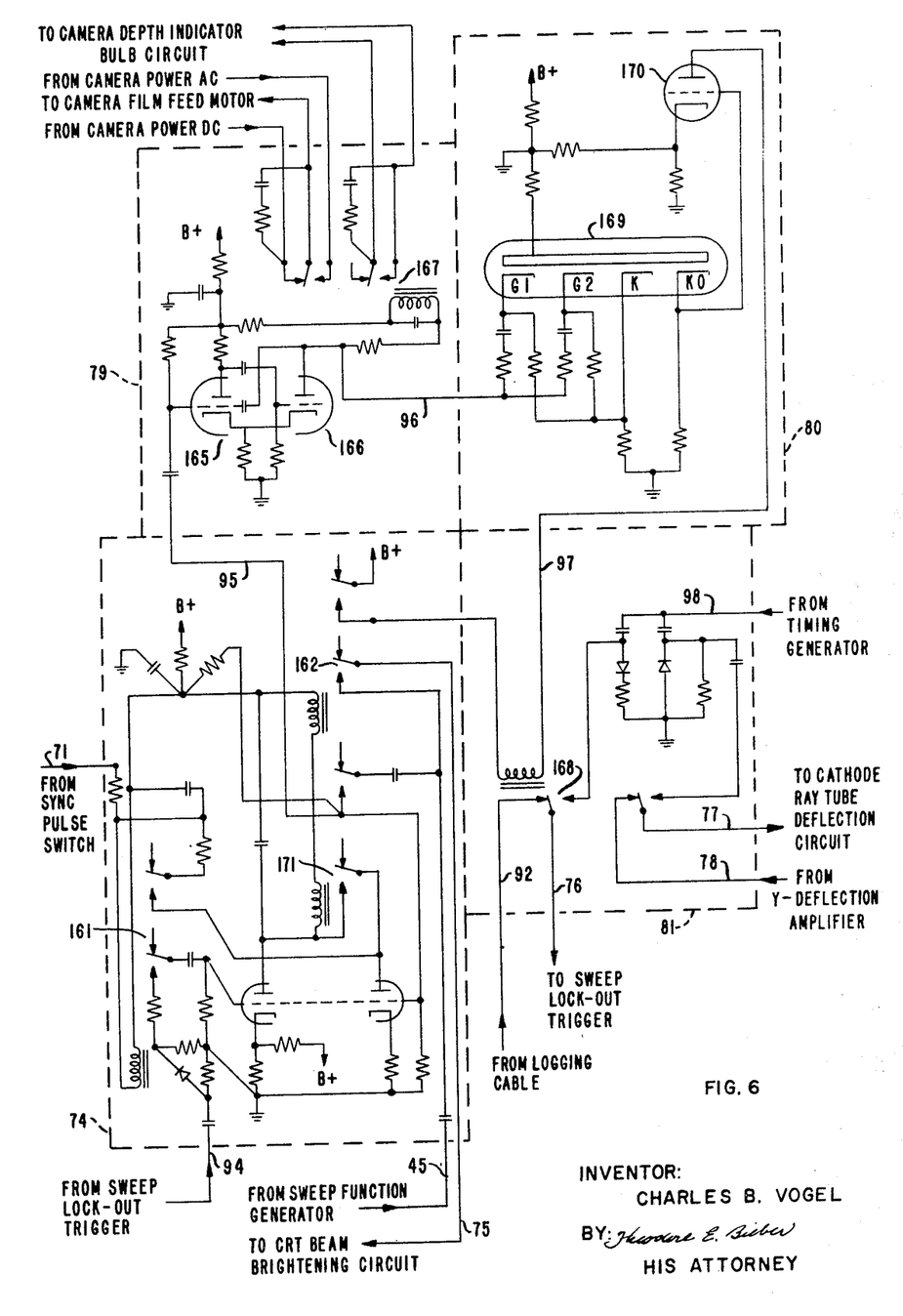
FIG. 6 is a detailed schematic wiring diagram of sampling circuitry included in the system of FIG. 5.

Referring now to FIG. 6, there is illustrated in greater detail the construction of the samplings circuitry assembly comprising camera control 79, counter 80, AND-gate 74, and signal distributor 71. The interconnections between the various units of this assembly provided by conductors 96, 95, 78 and 97 have the same relative position in FIG. 6 as in FIG. 5 and bear corresponding numbers. The circuits themselves will be readily understood by those skilled in the art. The AND-gate 74 comprises a relay 161 which is initially closed by the charging current going into capacitor 73 of FIG. 5 upon the closure of rotary switch 5 of FIG. 5. Once relay 161 is energized one of its contacts closed thereby latches the relay in an energized position by connecting the coil by means of a series resistor to the plate of triode 163 and thereby to a ground return. The other side of the relay coil is of course returned to B+ by means of a resistor. When a subsequent negative square wave of voltage is produced by sweep lockout trigger 21, this square wave is transmitted by means of conductor 94 into the AND-gate 74. Here it is differentiated and rectified and the trailing edge of the negative square wave of voltage thus provides a positive spike which is then transmitted through the now closed relay contacts of relay 161 to the control grid of triode 164, causing a momentary surge of current therethrough and thereby energizing the coils of relays 162 and 171. These relays are latched in an energized position by one of the contacts of relay 171, which connects the low side of the relay coils to the plate of triode 163 and thence to a ground return.

Energizing of the coils of relays 162 and 171 closes contacts which connect the output of sweep function generator 22 to the beam brightening circuits of cathode-ray oscilloscope 23. One of the pairs of contacts of relay 171 connects the output of sweep function generator 22 to a differentiation circuit comprising a capacitor and a resistor whereby there is produced, upon the production of the trailing edge of the next occurring positive square wave of voltage from the sweep function generator 22, a negative spike of voltage at the grid of triode 163 and at the grid of triode 165. Thus, on the production of the subsequent positive square wave of voltage from sweep function generator 22, the beam of the cathode-ray oscilloscope 23 is turned on to produce a recorded sweep, and upon the occurrence of the trailing edge of this square wave of voltage the triode 163 is momentarily made nonconductive thus causing the deenergizing of relays 162, 171 and 161.

This trailing edge of the positive square wave of voltage also is applied to the grid of vacuum tube 165. The camera control circuit 79 includes among other elements triode 165 and 166 which make up a Schmidt trigger circuit in which triode 166 is normally not conducting. However, upon the application of the above-mentioned negative spike of voltage to the control grid of triode 165, the Schmidt trigger circuit is triggered into its a-stable condition, causing a flow of current through the vacuum tube 166 and through the series connected relay 167. The flow of current then is maintained for a length of the time controlled by time constant of the Schmidt trigger comprising triodes 165 and 166. The Schmidt trigger circuit is of course a form of cathode coupled multivibrator. The energizing of relay 167 causes the closing of contacts which in turn energize a depth indicator incandescent bulb within the recording camera and the camera film feed motor. Thus the operations of depth indication and film transport occur only after the production of the recorded sweep on the cathode-ray oscilloscope. The counter 80 comprises triode 170 and a gas tube counter 169, for example type GC– 10B manufactured by Baird Atomic, Inc., of Cambridge, Mass. As successive pulses are transmitted into the gas tube counter 169 by means of conductor 96, conduction is transferred in succession from one cathode to another until finally current flows through cathode KO and thus places an energizing potential upon the grid of vacuum tube 170, thus energizing the relay 168 in the signal distributor 81. This energizing of relay 168, of course, can occur only when the contacts of relay 162 are closed and thus relay 168 can be energized only during the relatively short period of time that relay 162 is closed.

Figure 9:
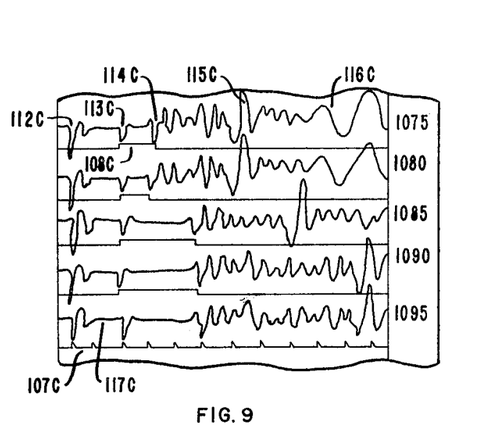
FIG. 9 is a portion of the film record of the oscilloscope traces produced by the system of FIG. 3.

Now, when relay 168 is closed, which occurs only after each ninth recorded cathode-ray oscilloscope trace, then the cathode-ray tube deflection circuit is disconnected by means of the contacts of relay 168 from the vertical deflection amplifier and conductor 78 and is connected instead to the differentiated and shaped output from the timing generator 93 which is transmitted into the signal distributor 81 by means of conductor 98. Furthermore, when relay 168 is closed the differentiated and shaped output of the timing generator 93 is also connected by a pair of relay contacts of relay 168 to the sweep lockout trigger so that the first sweep produced during the time interval that relay 168 is energized is synchronized with the production of one of the timing waves produced by timing generator 93. It should be noted that for the system of FIG. 5 timing generator 93 is not gated on by the signals from the subsurface instruments but rather operates continuously, producing a continuous train of timing waves. As a result of the above-described operation of the sampler circuit assembly, the output signals of the signal distributor 81, which are transmitted by means of conductor 77 to cathode-ray oscilloscope 23, having a form illustrated at 77C of FIG. 8. The oscillograph record produced has an appearance illustrated at FIG. 9. Here it is to be noted that after every ninth oscillograph signal trace there is produced as at 107C a timing trace. In FIG. 9 this timing trace consists of high-frequency pulses, very narrow and having a frequency of 5 kilocycles; these pulses are produced continuously by timing wave generator 93.

The following will describe the operation of the digital counter and associated circuitry and the digital-to-analog converter and pen recorder shown in FIG. 5. The operation of this portion of the system is similar to corresponding portions of the system described with reference to FIG. 1. However, in the system of FIG. 5 special provision is made to reduce the incidence of erroneous measurements by means of the transmitting arming spike 112C of FIG. 8. Referring now to FIG. 8 at 47C, 54C, 48C, 99C and 51C are shown waveforms produced respectively at conductors 47, 54, 48, 99 and 51. Mechanism for the production of these waveforms is the same as for the production of waveforms having corresponding numbers and illustrated in FIG. 2 as being produced on conductors bearing corresponding numbers in FIG. 1.

The following will now describe operation of the arming circuit assembly comprising arming lockout trigger 84, delay generator 82, step function generator 83, and gate 85 of FIG. 5. Arming lockout trigger 84 comprises a bistable trigger circuit adjusted so that it is triggered by pulses having an amplitude of the transmitter arming spike pulse 112C of FIG. 8 and so that it is not triggered by smaller pulses such as the spike pulses produced in response to the production of second half cycles of received valid acoustical wave pulses by the subsurface receivers 36 and 37 of FIG. 5, and so that it is not triggered by random noise pulses such as those illustrated at 102C and 103C of trace 42C of FIG. 8, which are produced after the production of valid receiver signals by the subsurface instruments. The output of the bistable trigger circuit in arming lockout trigger 84 is differentiated, producing a waveform illustrated at 86C of FIG. 8. This negative spike pulse illustrated at 86C is then transmitted to delay generator 82 by conductor 86. Delay generator 82 contains a monostable trigger circuit with a period of the order of 100 microseconds. The output of this monostable trigger circuit is differentiated and thus provides a negative spike pulse as illustrated at 87C of FIG. 8. This negative spike pulse is transmitted by means of conductor 87 to the step function generator 83. Step function generator 83 comprises a bistable trigger circuit which is triggered by means of the negative spike voltage pulse illustrated at 87C and remains in the triggered condition until subsequently reset by a reset pulse as will be described below. The output of the bistable trigger circuit in step function generator 83 thus provides a positive going wave of voltage which is transmitted by means of conductor 88 to gate circuit 85. The positive going wave of voltage transmitted by conductor 88 is illustrated at 88C in FIG. 8. Gate circuit 85 is an AND gate, which is provided by counter trigger 25 with negative spike pulses of voltage, as illustrated at 47C, transmitted into gate 85 by means of conductor 47. The negative spike pulses of voltage on conductor 47 are transmitted through gate 85 to conductor 90 on which there appears a waveform illustrated at 90C of FIG. 8. The pulses on conductor 90 and pulses on conductor 54, on being transmitted into gating function generator 26, then control the production of gate pulses illustrated at 48C in a manner exactly as described with reference to the system of FIG. 1. These gating pulses then are transmitted into the gate 28 where they control the production of trains of high-constant-frequency waves which in turn are transmitted from gate 28 by means of conductor 50 into digital counter 29 and control thereby the operation of digital-to-analog converter 31 and pen recorder 7 as described above with reference to the system of FIG. 1. The reset pulse is transmitted from reset generator 30 and from terminal 51 thereof to the step function generator 83 to reset the step function generator to its initial condition at the same instant that the digital counter is reset. Furthermore, the gating pulse produced by the gating function generator is transmitted by means of conductor 91 to the cathode-ray oscilloscope 23 wherein it produces a vertical deflection on a second beam of the cathode-ray oscilloscope to indicate on the photographic oscillographic record the duration of the time interval during which the digital counter measures time between the negative spike pulses produced in the subsurface instrument.

At 42C', 44C', 48C' and 88C' are shown on an expanded time scale the waveforms produced at correspondingly numbered points of the system of FIG. 5. At 9 is illustrated the cathode-ray oscillographic record produced by the system of FIG. 5. At 112C is the transmitter arming spike pulse; 113C is the negative spike pulse demarking the time of production of the second half cycle of received signal at the receiver 36 in the subsurface instrument, at 114C is shown the negative spike pulse produced in time coincidence with the production of the second half cycle of received compressional wave energy at the receiver 37 in a subsurface instrument. At 115C is shown the shear wave arrival at receiver 37, at 116C is shown the tube wave arrival at receiver 37; at 108C is shown the square wave of voltage recorded on the second beam of the cathode-ray tube of the cathode-ray oscilloscope 23 to indicate the duration of counting by the digital counter 29 during the recording process. At 117C is shown the time interval intervening between production of the transmitter arming spike pulse and the negative spike pulse indicating the arrival of the second half cycle of received energy at receiver 36; at 107C is illustrated the timing wave produced by timing generator 98 and transmitted through signal distributor 81 to cathode-ray oscilloscope 23.

Figure 10:
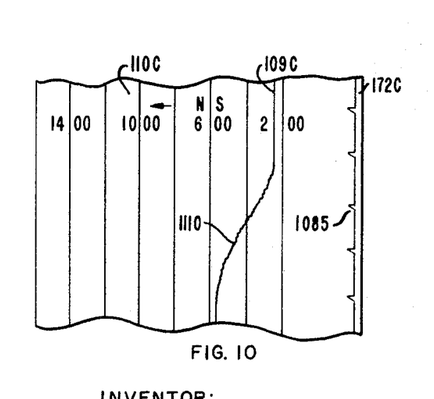
FIG. 10 is a portion of the pen recorder produced by the system of FIG. 5.

At FIG. 10 is illustrated the pen recorder record produced by the system of FIG. 3. Here we note that the trace 109C is much smoother than the corresponding trace of the system of FIG. 1 because of the fact that many more measurements are produced for each foot of hole depth logged because of the high repetition rate of the transmitter in the subsurface instrument. 110C shows vertical lines indicating the horizontal time scale, at 111C there are shown indications of the very small line segments making up the curve of trace 109C, Now, with reference back to FIG. 5 there are indicated on the right-hand edge of chart record 32 a series of horizontal deflections of vertical line 172C. This line and the corresponding deflections are produced by a kicker pen 173 which in turn is connected by conductors not shown to conductor 75, whereby each time there is recorded by the camera a cathode-ray oscilloscope trace, then at the same instant there is produced on the right-hand edge of the record 32 a horizontal deflection to indicate the successive depths at which oscillogram records are photographed. Referring back to FIG. 8 there is shown at 72 this vertical line, the horizontal deflections of which indicate the depths at which oscillographic records are recorded as described above.

It is to be noted that this alternative system provides in addition to the features provided in the system illustrated by FIG. 1 certain refinements. These is provided in combination with a high repetition rate transmitter and a correspondingly smooth plotted curve an oscillographic record in which records are made at preselected depths by use of a special sampler circuit assembly. Furthermore, there are provided especially simple and convenient circuits for receiver pulse conversion in response to the production of the second half cycle of receiver signal by subsurface transducer. A particular advantage of this simple circuitry is that it does not require the use of a coupling pulse transformer, which in the usual operation degrades the narrowness of the translated pulses nor is there required a separate power supply for spike generation. Furthermore, there is provided means for indicating on the smoothly plotted curve the depths at which photographic records are made of cathode-ray oscillograms displaying the wave shapes of signals produced within the borehole.

I claim as my invention:

1. A method for acoustically logging a well by moving transducers for generating and receiving acoustic impulses within the borehole of the well while repetitively generating acoustic impulses and recording oscillograms of signals from the receiving transducers, said method comprising:
   a. generating a discrete control signal when said transducers have moved a selected increment of distance in the borehole of the well;
   b. rendering effective a normally ineffective means for recording oscillograms of signals from the receiving transducers in time correspondence with said control signal;
   c. and rendering said means for recording oscillograms ineffective after the lapse of a time period having sufficient length to permit the recording of signals from the receiving transducers due to arrivals of an acoustic impulse generated while said transducers are positioned substantially as they were when said control signal was generated.

2. The method of claim 1 and in addition producing an analog record of a characteristic of the time required for the acoustic impulses to travel to said receiving transducers; and producing distinctive marks on the chart of said analog record in time relationship to the production of said oscillograms.

3. In an acoustical logging system including at least one receiver and a repetitively excited transmitter contained within an instrument adapted to traverse a borehole, a method for reducing the incidence of erroneous recorded measurements comprising:
   a. generating a relatively large signal in time relationship to the excitation of the transmitter;
   b. rendering effective a normally ineffective recording system in response to said relatively large signal;
   c. and rendering said recording system ineffective in response to succeeding relatively smaller signals from the receiver contained in said subsurface instrument.

4. In an acoustic well logging system downhole apparatus for positively identifying the time of arrival of the second half cycle of acoustic energy at a receiving transducer in a subsurface instrument, said apparatus comprising;
   a. trigger means responsive to the arrival of said second half cycle of acoustic energy to produce an electrical pulse of duration less than that of said second half cycle;
   b. means connected to said trigger means to transmit said pulse to the surface of the earth,
   c. and time interval measuring means at the surface of the earth connected to said pulse transmitting means for responding to said pulse as a determination of one limit of a time interval being measured.

5. A method of acoustic well logging comprising:
   a. repetitively generating acoustic waves in a borehole in the earth;
   b. detecting arrival of the second half cycle of such waves at each of a pair of detecting stations spaced a fixed distance apart longitudinally of said borehole and producing related electrical signals;
   c. deriving from the second half cycle of the electrical signals produced from such detection at each of said stations electrical pulses narrower than the said second half cycle;
   d. transmitting the pair of electrical pulses thereby produced from each of such waves to the surface of the earth;
   e. and there utilizing each of said pulse pairs as a measure of the time interval between the respective arrivals of the second half cycles of said acoustic waves at each of said two stations.

* * * * *